Aug. 19, 1958  D. J. WALKER  2,848,253
TRAILER HITCH
Filed May 7, 1957  2 Sheets-Sheet 2

Don J. Walker
INVENTOR.

United States Patent Office 2,848,253
Patented Aug. 19, 1958

2,848,253

TRAILER HITCH

Don J. Walker, Plant City, Fla., assignor of one-third to Charles J. McDonald, Plant City, and one-third to Warren M. Cason, Tampa, Fla.

Application May 7, 1957, Serial No. 657,548

2 Claims. (Cl. 280—513)

This invention relates in general to trailer hitches and more particularly to an improved ball and socket type lock mechanism trailer hitch.

Heretofore trailer hitches of the ball and socket type have been utilized with all types of locking means therein. However, the locking means which have been provided often contain numerous working parts, which are subject to a great deal of wear, or if over simplified have not provided a positive locking engagement and therefore are unsafe to use.

Therefore, the primary object of this invention is to provide a ball and socket type of trailer hitch having a minimum number of working parts and which is easily operated and maintained.

A further object of this invention is to provide a trailer hitch which will positively remain in locked engagement, but may very easily be disengaged.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a top plan view of the socket member, in a disengaged position and with the socket shown in section along the longitudinal center line thereof; and Figure 5 is a sectional view taken substantially along section line 5—5 of Figure 3.

Figure 1:
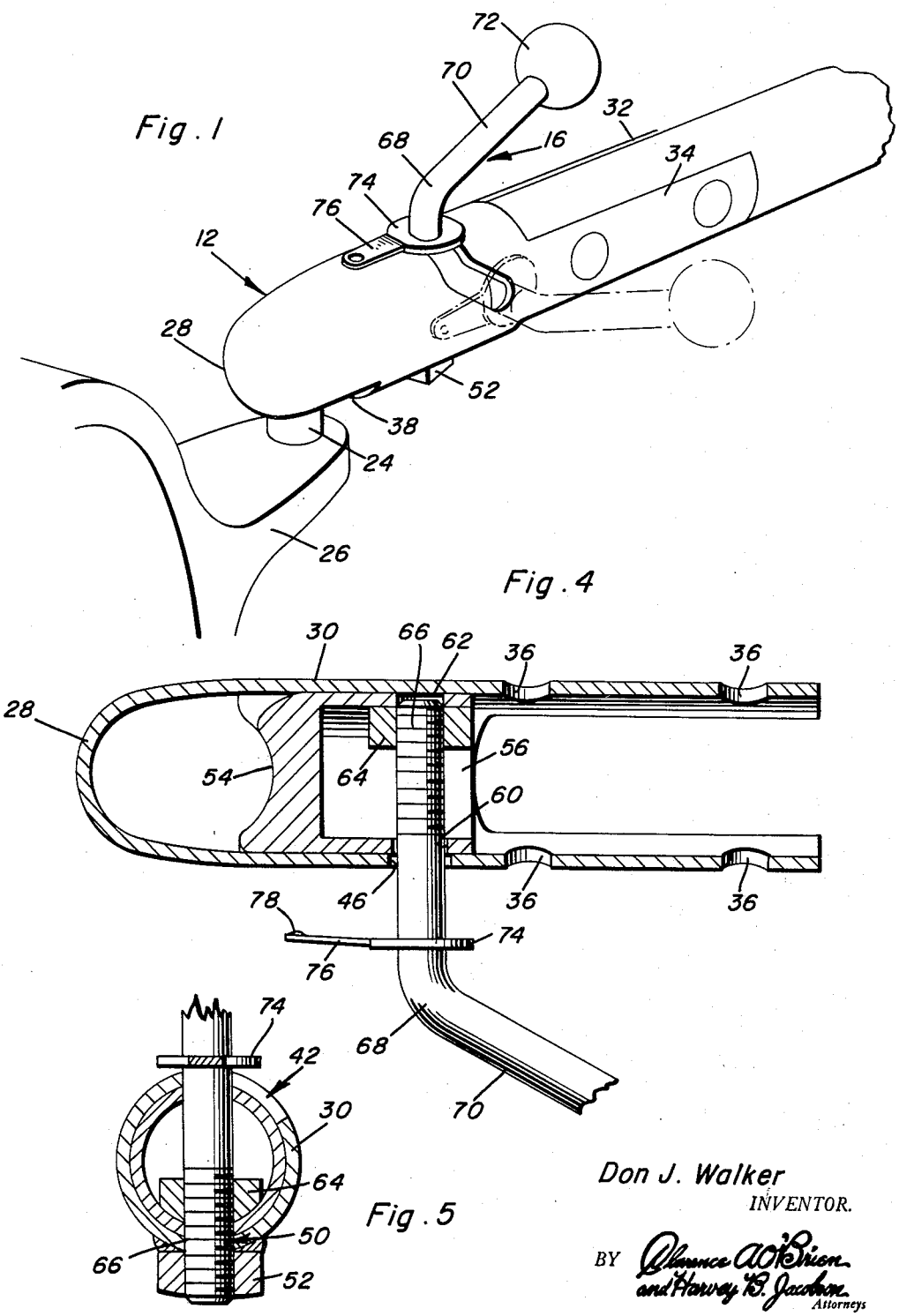
Figure 1 is a perspective view of the improved trailer hitch shown attached to a trailer tongue and a ball mounting bracket, with portions of the bracket and tongue broken away and an alternative position of the operating crank shown in phantom lines.

Referring now to the drawings in detail it will be noted that the trailer hitch consists of: a ball assembly which is referred to in general by the reference numeral 10, a socket which is referred to in general by the reference numeral 12, a retainer block which is referred to in general by the reference numeral 14, and an operating crank which is referred to in general by the reference numeral 16. The ball assembly 10 consists of a ball 18 having a stud 20 depending therefrom which is threaded at the outer extremity to receive a nut 22. The stud 20 closely adjacent to the ball is provided with a collar 24 which acts as a spacer when mounting the ball on a bracket 26 on the towing vehicle.

The socket member 12 consists of a semi-spherical nose 28, the inner surface of which matches the curve of the ball 18 for full engagement therewith when in an assembled position. The nose 28 terminates at the rear thereof in a cylindrical body 30, which in turn terminates in two rearwardly extending ears 32 and 34. The ears 32 and 34 are in opposed relation and are provided with apertures 36 for the mounting of the socket member on the tongue of the towed vehicle. The nose 28 and the body 30 on the lower surface thereof and at the junction of the two are provided with an enlarged opening 38 into which the ball 18 may be inserted with ease. The top surface of the body 30 is also provided with a small aperture 40, which is located on the longitudinal center line thereof and the purpose of which will be described hereinafter. The body 30 is further provided with a cam track, which is referred to in general by the reference numeral 42. The cam track 42 extends circumferentially from the upper surface of the body 30 as at 44 and then spirals downward and rearward as at 46 thus terminating on the left side of the body 30. As was previously mentioned, the cam track 42 at an upper end 48 is on the longitudinal center line of the body 30 and diametrically opposite the end 48, in the body 30 there is provided a circular aperture 50. A threaded nut 52 is suitably attached to the underside of the body 30, the threaded aperture therein being in alignment with the circular aperture 50.

Figure 3:
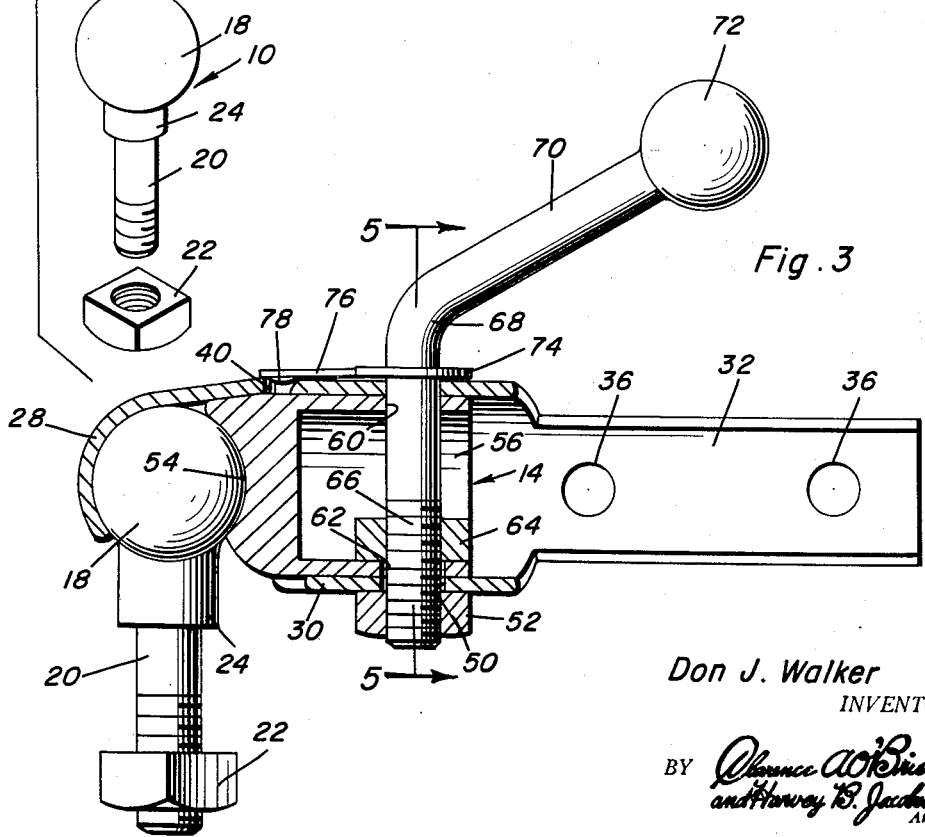
Figure 3 is an enlarged side elevation of the trailer hitch shown attached to a trailer ball and showing the socket member in section along the longitudinal center line thereof.

The retaining block 14, as is best seen in Figure 3, is slidably received in the socket member 12 and the forward end, which engages the ball 18, is of concave configuration as at 54 to match the curve of the ball 18. The block 14, at the rear thereof is provided with a cylindrical recess 56 and an upper circular opening 60 and a lower circular opening 62. The openings 60 and 62 being diametrically opposed. Interiorly of the opening 62 there is provided an internally threaded block 64, the internal threaded portion being in alignment with the opening 62. The block 64 is suitably attached to the interior of the block 14.

Figure 2:
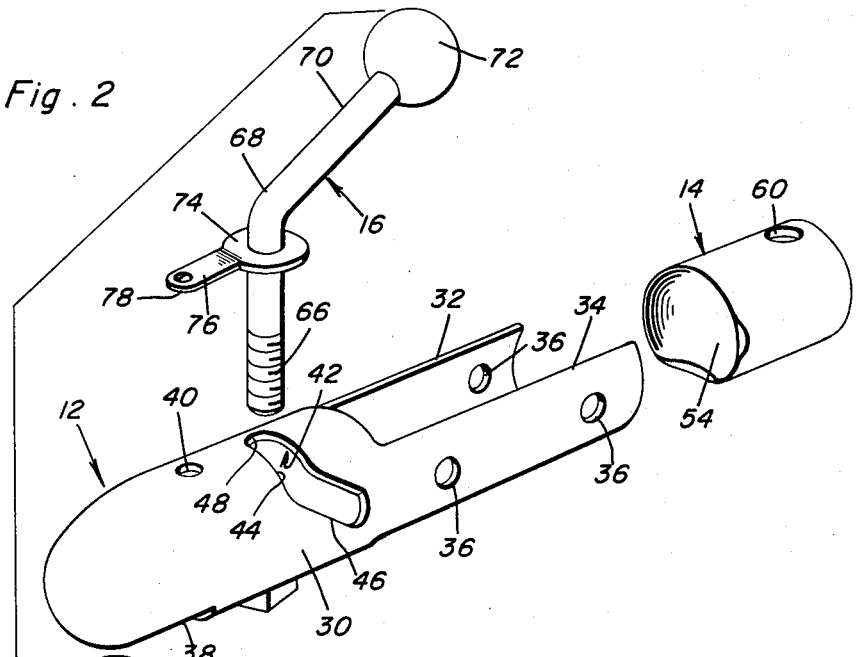
Figure 2 is an exploded perspective view of the trailer hitch showing all components thereof.

The operating crank 16, as is best seen in Figure 2, consists of a rod having threads 66 at the lower end, and which is bent as at 68 to form an offset arm 70. The arm 70 at the outer end thereof is provided with a spherical handle 72. Intermediate the bend 68 and the threads 66 there is provided an annular ring 74 which is suitably secured to the crank and has radially extending therefrom a resilient arm 76. The arm 76 adjacent the outer end thereof is provided with a depending detent 78. It will be noted that the threaded portion 66 of the crank, when assembled, engages the threaded block 64 and the threaded nut 52. At the same time, the crank extends through the cam track 42.

In operation the socket member 12 is placed on the ball 10, it being assumed that the retaining block 14 is in a retracted position as shown in Figure 4. The block 14 is then rotated by means of the crank 16, with the crank engaging the cam track 42 thus being cammed forward until it reaches the section 44 of the cam track. The handle movement may be continued circumferentially until the crank reaches a vertical position at that time, the openings 48, 60, 62, and 50 are all in alignment. The crank 16 may then be rotated to threadably engage the nut 52 until the detent 78 engages the aperture 40 in the body. The resiliency of the arm 76 maintaining this engagement. The towed vehicle may then be utilized without fear of any disengagement of the ball and socket inasmuch as the retaining block is positively locked in position by the crank. When it is desired to remove the socket from the ball the reverse procedure is followed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A trailer hitch comprising a ball adaptable to be attached to a towing vehicle, and a socket adapted to be attached to a trailer, said socket comprising an elongate length of tubing having a closed, rounded end provided with a transverse opening therein adaptable to be engaged over said ball, a retainer block within said socket having a concave end opposed to the inner surface of said closed, rounded end of the socket for cooperation therewith in retaining the socket on the ball, said block rotatably and slidably received in said socket, means for locking said block in retaining engagement with said ball, said locking means including a crank extending diametrically through said socket and said block, and a threaded aperture formed integral with said socket, one end of said crank having an operating handle thereon, the opposite end of said crank being threaded to engage said threaded aperture when in a locked position, means for selectively maintaining said crank in a non-rotatative position, said maintaining means including a resilient arm secured to said crank, said arm extending radially outward from said crank, a detent formed in the outer extremity of said arm, said socket having an aperture therein engageable by said detent whereby such engagement will prevent said crank from rotating in said threaded aperture, means for rotatably retracting said block from engagement with said ball whereby the socket may be removed from said ball, said retracting means including a cam track formed in said socket, said crank extending through said cam track, said opposite end of said crank being threadably engaged in said block whereby the crank may be rotated and disengaged from said threaded aperture and the crank and block rotated with relation to the socket, said cam track engaging said crank to cause the block to disengage the ball.

2. A trailer hitch socket comprising an elongate tubular body having a rounded, closed end and having a side opening therein adjacent said closed end for receiving a hitch ball, a retainer block slidably disposed in said tubular body having one end provided with a concavity opposed to the inner surface of said rounded closed end of the tubular body so as to cooperate therewith, in one position of said block, to retain the socket on a hitch ball, the opposite end of said block being provided with a recess and having diametrically opposed openings adjacent said opposite end, a nut fixed within said recess at one of said openings, an elongate cam track formed in said tubular body and there being an opening in the body diametrically opposed to that end of the cam track nearest said closed end of the body, a nut fixed to said body at the opening therein whereby the nut in the retainer block is registrable therewith, a crank having a threaded shank projecting through said cam track and into said retainer block for threaded engagement with the nut carried thereby, said shank being of sufficient length to be threaded completely through said retainer block and into the nut carried by said tubular body to lock the retainer block thereto.

References Cited in the file of this patent
UNITED STATES PATENTS 2,558,906    Leon                 July 3, 1951

FOREIGN PATENTS 897,208    Germany            Nov. 19, 1953
229,546    Switzerland          Feb. 1, 1944